(12) United States Patent
Lee et al.

(10) Patent No.: US 11,074,464 B2
(45) Date of Patent: Jul. 27, 2021

(54) DEFINING BOUNDARY FOR DETECTED OBJECT

(71) Applicant: Ford Global Technologies, LLC, Dearborn, MI (US)

(72) Inventors: Sangjin Lee, Taylor, MI (US); Krishanth Krishnan, Windsor (CA); Ankit Girish Vora, Dearborn, MI (US); Siddharth Agarwal, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 16/522,349

(22) Filed: Jul. 25, 2019

(65) Prior Publication Data
US 2021/0027075 A1 Jan. 28, 2021

(51) Int. Cl.
*G06K 9/00* (2006.01)
*G05D 1/02* (2020.01)
*G06T 7/70* (2017.01)

(52) U.S. Cl.
CPC ....... *G06K 9/00825* (2013.01); *G05D 1/0231* (2013.01); *G06K 9/00818* (2013.01); *G06T 7/70* (2017.01); *G06T 2207/30252* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 5,047,783 A | 9/1991 | Hugenin | |
| 5,615,324 A | 3/1997 | Kuboyama | |
| 5,760,781 A | 6/1998 | Kaufman et al. | |
| 6,366,701 B1 | 4/2002 | Chalom et al. | |
| 9,600,892 B2 | 3/2017 | Patel et al. | |
| 10,304,191 B1* | 5/2019 | Mousavian | G06T 7/50 |
| 2016/0102975 A1 | 4/2016 | McCloskey et al. | |
| 2017/0116710 A1 | 4/2017 | Schmidt et al. | |
| 2017/0154482 A1* | 6/2017 | Osborne | E05F 15/77 |
| 2018/0364717 A1 | 12/2018 | Douillard et al. | |
| 2019/0391578 A1* | 12/2019 | Tariq | G05D 1/0231 |
| 2020/0160542 A1* | 5/2020 | Kanzawa | G06T 7/11 |
| 2020/0326703 A1* | 10/2020 | Li | B60W 60/001 |

\* cited by examiner

*Primary Examiner* — Vikkram Bali
(74) *Attorney, Agent, or Firm* — Frank A. MacKenzie; Bejin Bieneman PLC

(57) ABSTRACT

A computer includes a processor and a memory storing instructions executable by the processor to receive data from a sensor specifying a plurality of points, the points including a plurality of first points that describe an object; define a boundary surrounding the first points while minimizing a volume of space that is both (i) contained by the boundary and (ii) identified as unoccupied; and actuate a component with respect to a vehicle based on the boundary.

20 Claims, 5 Drawing Sheets

DEFINING BOUNDARY FOR DETECTED OBJECT

BACKGROUND

Vehicles can include sensors for detecting the external world, e.g., objects and/or characteristics of surroundings of the vehicle, such as other vehicles, road lane markings, traffic lights and/or signs, pedestrians, etc. For example, the sensors may include radar sensors, scanning laser range finders, light detection and ranging (LIDAR) devices, and image processing sensors such as cameras. A LIDAR device detects distances to objects by emitting laser pulses at a particular wavelength and measuring the time of flight for the pulse to travel to the object and back.

Data from the sensors is often generated as a plurality of points. The points must be transformed into a representation usable by a computer for the computer to actuate components based on the data, for example, for the computer to autonomously operate a vehicle.

DETAILED DESCRIPTION

Figure 1:
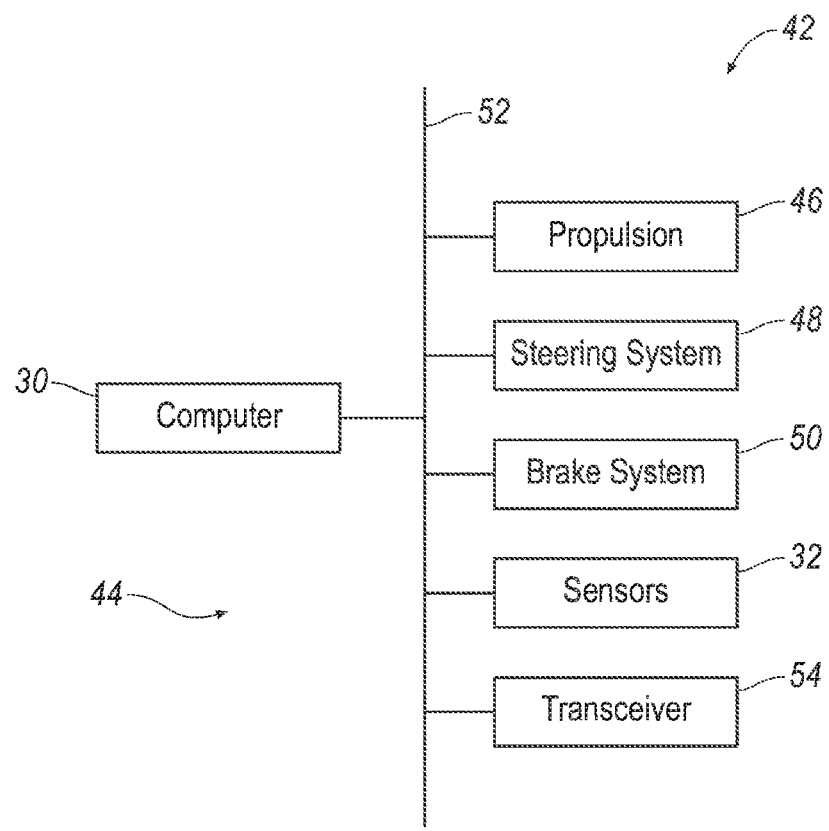
FIG. 1 is a block diagram of an example vehicle.

The system described below can generate a simple representation of an object in the form of a boundary of the object, e.g., a rectangular bounding box. Using a simple representation of an object allows for fast processing of objects in the environment. Furthermore, the system takes unoccupied space into account when generating the boundary from a plurality of points. Using unoccupied space can result in accurate boundaries, facilitating reliable decision-making by a computer responsible for actuating components based on a position and/or orientation of the object.

A computer includes a processor and a memory storing instructions executable by the processor to receive data from a sensor specifying a plurality of points, the points including a plurality of first points that describe an object; define a boundary surrounding the first points while minimizing a volume of space that is both (i) contained by the boundary and (ii) identified as unoccupied; and actuate a component with respect to a vehicle based on the boundary.

The points may be described in the sensor data as three-dimensional points, and the instructions may further include to project the points into two-dimensional horizontal space before defining the boundary.

The instructions may further include to identify space as unoccupied upon determining that the sensor has an unobstructed view through the space to one of the points.

The boundary may be a rectangular bounding box.

The instructions may further include to generate a convex hull surrounding the first points, and to define the boundary as a rectangular bounding box based on the convex hull. The instructions may further include to generate a plurality of candidate rectangular bounding boxes based on the convex hull, defining the boundary may include selecting a first candidate rectangular bounding box from the candidate rectangular bounding boxes, and, of the candidate rectangular bounding boxes, the first candidate rectangular bounding box may contain a minimum volume of space that is both (i) contained by the respective candidate rectangular bounding box and (ii) identified as unoccupied. The convex hull may include a plurality of line segments, each candidate rectangular bounding box may include four sides, and each candidate rectangular bounding box may have one side overlapping one line segment of the convex hull and may have a minimum length and width to surround all the first points.

The vehicle may include the computer, and the component may be at least one of a steering system, a brake system, or a propulsion of the vehicle.

The object may be the vehicle, and the component may be an infrastructure component in proximity to the vehicle.

A method includes receiving data from a sensor specifying a plurality of points, the points including a plurality of first points that describe an object; defining a boundary surrounding the first points while minimizing a volume of space that is both (i) contained by the boundary and (ii) identified as unoccupied; and actuating a component with respect to a vehicle based on the boundary.

The points may be described in the sensor data as three-dimensional points, and the method may further include projecting the points into two-dimensional horizontal space before defining the boundary.

The method may further include identifying space as unoccupied upon determining that the sensor has an unobstructed view through the space to one of the points.

The boundary may be a rectangular bounding box.

The method may further include generating a convex hull surrounding the first points, and defining the boundary as a rectangular bounding box based on the convex hull. The method may further include generating a plurality of candidate rectangular bounding boxes based on the convex hull, defining the boundary may include selecting a first candidate rectangular bounding box from the candidate rectangular bounding boxes, and, of the candidate rectangular bounding boxes, the first candidate rectangular bounding box may contain a minimum volume of space that is both (i) contained by the respective candidate rectangular bounding box and (ii) identified as unoccupied. The convex hull may include a plurality of line segments, each candidate rectangular bounding box may include four sides, and each candidate rectangular bounding box may have one side overlapping one line segment of the convex hull and may have a minimum length and width to surround all the first points.

The component may be at least one of a steering system, a brake system, and a propulsion of the vehicle.

The object may be the vehicle, and the component may be an infrastructure component in proximity to the vehicle.

A system includes a computer programmed to receive data from a sensor specifying a plurality of points, the points including a plurality of first points that describe an object; and define a boundary surrounding the first points while minimizing a volume of space that is both (i) contained by the boundary and (ii) identified as unoccupied; and means for actuating a component with respect to a vehicle based on the boundary.

With respect to the Figures, a computer 30 includes a processor and a memory storing instructions executable by the processor to receive data from a sensor 32 specifying a plurality of points 34, the points 34 including a plurality of first points 36 that describe an object; define a boundary 38 surrounding the first points 36 while minimizing a volume 40 of space that is both (i) contained by the boundary 38 and (ii) identified as unoccupied; and actuate a component 42 with respect to a vehicle 44 based on the boundary 38.

With reference to FIG. 1, the vehicle 44 may be any passenger or commercial automobile such as a car, a truck, a sport utility vehicle, a crossover, a van, a minivan, a taxi, a bus, etc.

The vehicle 44 may be an autonomous vehicle. The computer 30 can be programmed to operate the vehicle 44 independently of the intervention of a human driver, completely or to a lesser degree. The computer 30 may be programmed to operate a propulsion 46, a steering system 48, a brake system 50, and/or other vehicle systems. For the purposes of this disclosure, autonomous operation means the computer 30 controls the propulsion 46, steering system 48, and brake system 50 without input from a human driver; semi-autonomous operation means the computer 30 controls one or two of the propulsion 46, steering system 48, and brake system 50 and a human driver controls the remainder; and nonautonomous operation means a human driver controls the propulsion 46, steering system 48, and brake system 50.

The vehicle 44 can include the computer 30. The computer 30 is a microprocessor-based controller. The computer 30 includes a processor, a memory, etc. The memory of the computer 30 includes media for storing instructions executable by the processor as well as for electronically storing data and/or databases.

The computer 30 may transmit and receive data through a communications network 52 such as a controller area network (CAN) bus, Ethernet, WiFi, Local Interconnect Network (LIN), onboard diagnostics connector (OBD-II), and/or by any other wired or wireless communications network 52. The computer 30 may be communicatively coupled to the propulsion 46, the steering system 48, the brake system 50, the sensors 32, a transceiver 54, and other components via the communications network 52.

The propulsion 46 of the vehicle 44 generates energy and translates the energy into motion of the vehicle 44. The propulsion 46 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 46 can include an electronic control unit (ECU) or the like that is in communication with and receives input from the computer 30 and/or a human driver. The human driver may control the propulsion 46 via, e.g., an accelerator pedal and/or a gear-shift lever.

The steering system 48 is typically a conventional vehicle steering subsystem and controls the turning of the wheels. The steering system 48 may be a rack-and-pinion system with electric power-assisted steering, a steer-by-wire system, as both are known, or any other suitable system. The steering system 48 can include an electronic control unit (ECU) or the like that is in communication with and receives input from the computer 30 and/or a human driver. The human driver may control the steering system 48 via, e.g., a steering wheel.

The brake system 50 is typically a conventional vehicle braking subsystem and resists the motion of the vehicle 44 to thereby slow and/or stop the vehicle 44. The brake system 50 may include friction brakes such as disc brakes, drum brakes, band brakes, etc.; regenerative brakes; any other suitable type of brakes; or a combination. The brake system 50 can include an electronic control unit (ECU) or the like that is in communication with and receives input from the computer 30 and/or a human driver. The human driver may control the brake system 50 via, e.g., a brake pedal.

The vehicle 44 can include the sensors 32. The sensors 32 may detect the external world, e.g., objects and/or characteristics of surroundings of the vehicle 44, such as other vehicles, road lane markings, traffic lights and/or signs, pedestrians, etc. For example, the sensors 32 may include radar sensors, scanning laser range finders, light detection and ranging (LIDAR) devices, and image processing sensors such as cameras. A LIDAR device detects distances to objects by emitting laser pulses at a particular wavelength and measuring the time of flight for the pulse to travel to the object and back.

The transceiver 54 may be adapted to transmit signals wirelessly through any suitable wireless communication protocol, such as Bluetooth®, WiFi, IEEE 802.11a/b/g, other RF (radio frequency) communications, etc. The transceiver 54 may be adapted to communicate with a remote server, that is, a server distinct and spaced from the vehicle 44. The remote server may be located outside the vehicle 44. For example, the remote server may be associated with another vehicle (e.g., V2V communications), an infrastructure component 56 (e.g., V2I communications via Dedicated Short-Range Communications (DSRC) or the like), an emergency responder, a mobile device associated with the owner of the vehicle 44, etc. The transceiver 54 may be one device or may include a separate transmitter and receiver.

Figure 2:
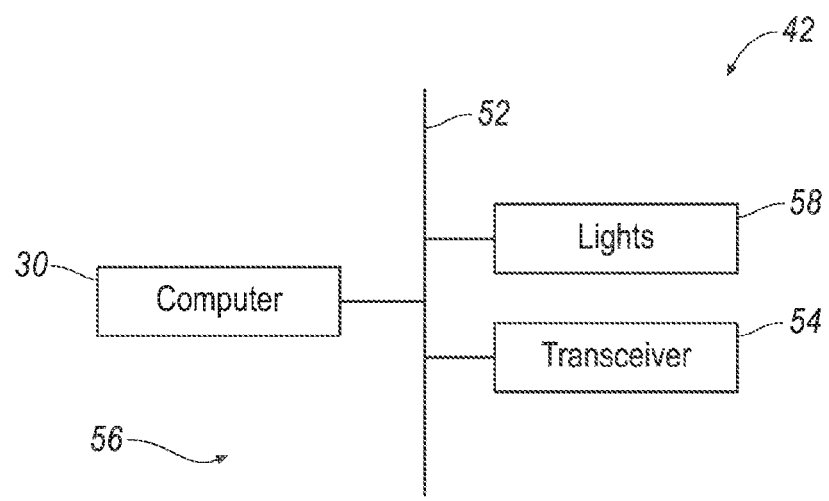
FIG. 2 is a block diagram of an example infrastructure component.
Figure 3:
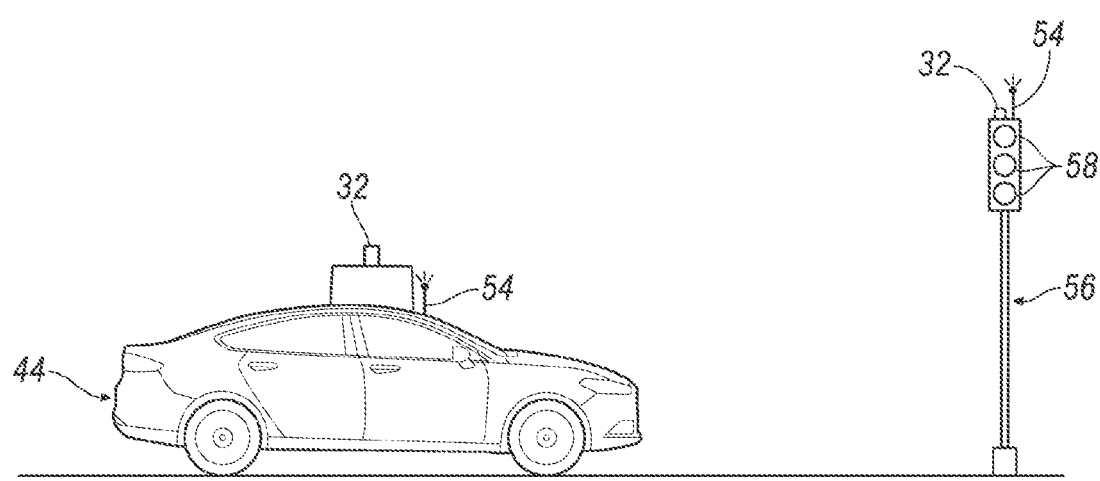
FIG. 3 is a diagram of the vehicle and the infrastructure component.

With reference to FIGS. 2 and 3, the infrastructure component 56 can include the computer 30, the communications network 52, and the transceiver 54. The infrastructure component 56 can be anything that can usefully actuate in response to an action by the vehicle 44. For example, as shown in FIG. 3, the infrastructure component 56 can be a traffic signal including a plurality of lights 58, e.g., green, yellow, and red lights 58 positioned to be visible to oncoming lanes of traffic. Other examples include a communications relay for providing information to vehicles 44; a railroad crossing signal and gate; a boom barrier, i.e., a gate pivotable between a down position blocking the vehicle 44 from traveling along a lane and an up position permitting travel along the lane; garage doors; etc.

Figure 4:
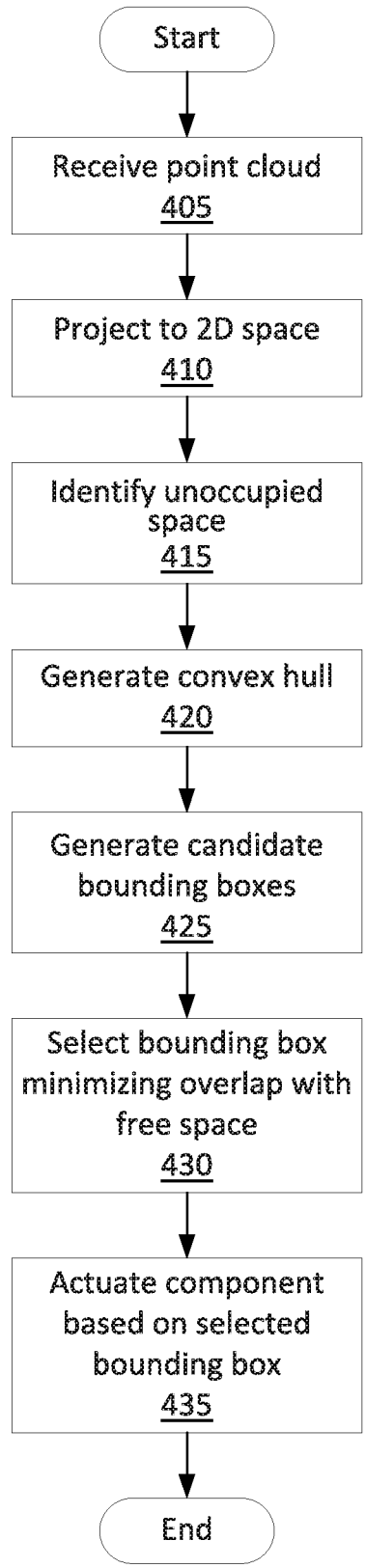
FIG. 4 is a process flow diagram of an example process for generating a bounding box for an object.

FIG. 4 is a process flow diagram illustrating an exemplary process 400 for generating a boundary 38 for an object. The memory of the computer 30 stores executable instructions for performing the steps of the process 400. As a general overview of the process 400, the computer 30 generates a convex hull 62 (defined below) for the set of first points 36 describing the object; generates a plurality of candidate boundaries 38 based on the convex hull 62; selects the candidate boundary 38 minimizing overlap between the boundary 38 and unoccupied space 60, i.e., space identified as unoccupied because the sensor 32 has an unobstructed view of at least one of the points 34 through the space; and actuates a component 42 based on the selected boundary 38.

The process 400 begins in a block 405, in which the computer 30 receives data from one or more of the sensors 32. The data specifies a plurality of points 34. The points 34 are described in the data as three-dimensional points, i.e., as a set of ordered triples. Each ordered triple can represent a point 34 in any suitable coordinate system, e.g., Cartesian, cylindrical, polar, etc. For example, the ordered triples can be represented as a Cartesian coordinate system with orthogonal horizontal x- and y-axes and a vertical z-axis, i.e., $((x_1, y_1, z_1), (x_2, y_2, z_2), \ldots (x_n, y_n, z_n))$. The points 34 include a plurality of first points 36 that describe an object. The first points 36 can be selected from the rest of the points 34 by, e.g., a convolutional neural network (CNN). The rest of the process 400 is described with respect to the first points 36 for one object, but the points 34 may also describe other objects, for each of which the same steps below can be independently performed. The points 34 are assigned in computer 30 the memory of the computer 30 to one of the various objects.

Figure 5:
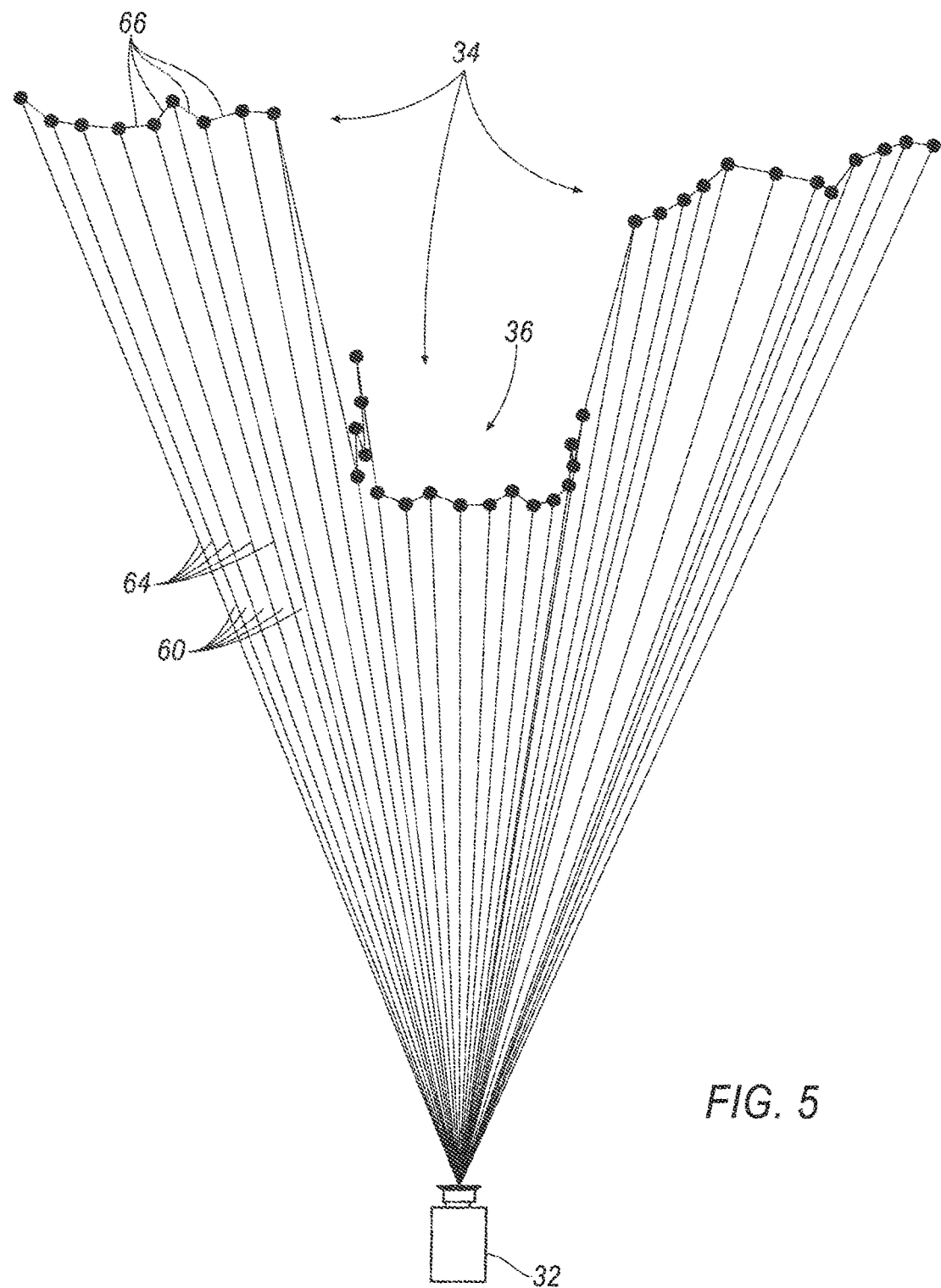
FIG. 5 is a diagram of a point cloud specified by sensor data.

Next, in a block 410, the computer 30 projects the points 34 from three-dimensional space to two-dimensional space. For the Cartesian coordinate system described above, the projection can be accomplished by removing the z-coordinate from each ordered triple, i.e., $((x_1, y_1, z_1), (x_2, y_2, z_2), \ldots (x_n, y_n, z_n))$ can be mapped to $((x_1, y_1), (x_2, y_2), \ldots (x_n, y_n))$. The points 34 in a horizontal two-dimensional plane are shown in FIG. 5. For other coordinate systems, the projection can be done using conventional linear-algebra techniques.

Next, in a block 415, the computer 30 identifies unoccupied space 60 in the environment. For the purposes of this disclosure, "unoccupied space" is defined as space not containing an object. The computer 30 can identify unoccupied space 60 as the two-dimensional space that is enclosed by unblocked straight lines 64 between the sensor 32 and respective points 34 and connecting lines 64 between circumferentially adjacent points 34, i.e., connecting lines 64 each between a point 34 and the next closest point 34 moving circumferentially around the sensor 32 in the horizontal plane. A straight line 64 is blocked if an object crosses the straight line 64, i.e., if two points 34 assigned to the same object are on opposite sides of the straight line 64 and are closer to the sensor 32 than the point 34 at the end of the straight line 64. In essence, the unoccupied space 60 is the two-dimensional space through which the sensor 32 has an unobstructed view of the points 34, as illustrated in FIG. 5.

Next, in a block 420, the computer 30 generates the convex hull 62 surrounding the first points 36. For the purposes of this disclosure, a "convex hull" is the minimal-area convex polygon surrounding all of a set of points. A convex polygon is a polygon in which no line segment between two points on the perimeter extends outside the polygon. Colloquially, the convex hull 62 is the shape formed by stretching and releasing (i.e., allowing to relax) a rubber band around all of a set of points. The computer 30 generates the convex hull 62 by applying one of multiple conventional algorithms of computational geometry for doing so, e.g., the Graham scan, to the first points 36. The convex hull 62 includes a plurality of line segments 68 forming the perimeter of the convex hull 62 and connecting a subset of the first points 36, as shown in FIG. 6.

Figure 6:
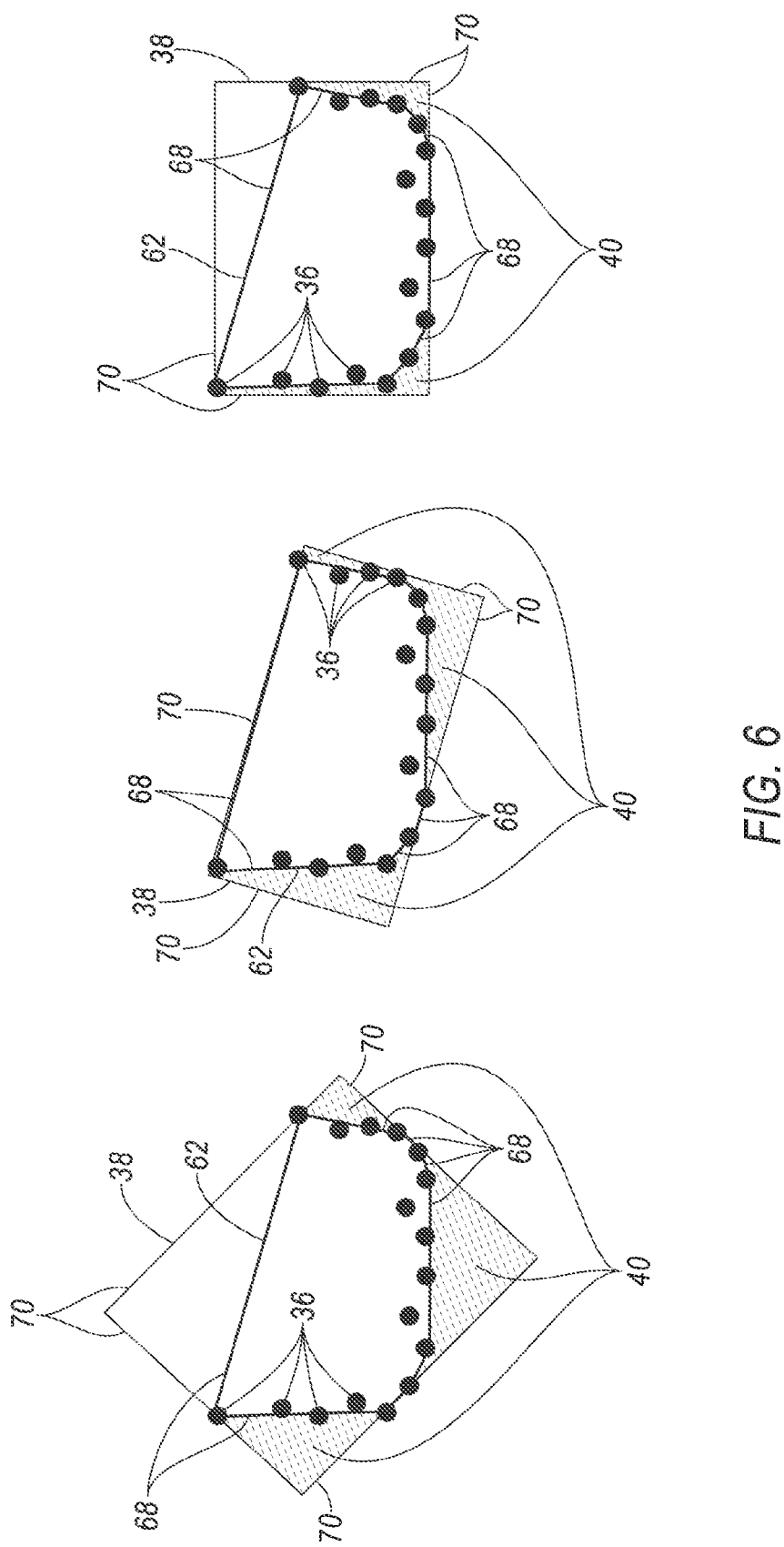
FIG. 6 is a diagram of a plurality of candidate bounding boxes.

Next, in a block 425, the computer 30 generates a plurality of candidate boundaries 38 based on the convex hull 62, as shown in FIG. 6. The candidate boundaries 38 are rectangular bounding boxes, i.e., quadrilaterals with 90° angles, i.e., polygons of four sides 70 connected at 90° angles. The computer 30 can generate one candidate boundary 38 for each line segment 68 of the convex hull 62. Each candidate boundary 38 has one side 70 overlapping the respective line segment 68 of the convex hull 62 and has a minimum length and width to surround all the first points 36.

Next, in a block 430, the computer 30 selects a first candidate boundary 38 from the candidate boundaries 38. The first candidate boundary 38 contains the minimum volume 40 of unoccupied space 60 of the candidate boundaries 38. For each candidate boundary 38, the computer 30 calculates the volume 40 that is both (i) contained by the candidate boundary 38 and (ii) identified as unoccupied in the block 415. The candidate boundary 38 with the smallest such volume 40 is the first candidate boundary 38.

Next, in a block 435, the computer 30 actuates the component 42 with respect to the vehicle 44 based on the selected boundary 38. For example, the component 42 can be at least one of the propulsion 46, the steering system 48, and the brake system 50. The computer 30 of the vehicle 44 can actuate the propulsion 46, the steering system 48, and the brake system 50 using known autonomous-driving algorithms to drive the vehicle 44 while treating the boundary 38 as defining a target object to be avoided, e.g., avoiding contacting with or keeping at least a minimum distance away from the object, as represented by the selected boundary 38. The computer 30 can also actuate the propulsion 46, the steering system 48, and the brake system 50 to avoid locations at which the object may soon be. The computer 30 can determine likely future locations for the object in part by using the orientation of the selected boundary 38 to delimit possible directions of travel. For another example, the component 42 can be the infrastructure component 56, and the object is the vehicle 44, to which the infrastructure component 56 is reacting. For example, the computer 30 of the infrastructure component 56 can actuate the lights 58 in response to the vehicle 44 approaching an intersection, e.g., by beginning a cycle to switch to illuminating the green light facing toward the vehicle 44 and switching to illuminating the red light facing a cross street of the intersection in response to the vehicle 44 approaching the intersection while no traffic approaches from the cross street. For another example, the computer 30 can actuate the transceiver 54 to transmit a message to the vehicle 44 stating, e.g., when the lights 58 will cycle to a different state, e.g., will turn yellow and red. After the block 435, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
    receive data from a sensor specifying a plurality of points, the points including a plurality of first points that describe an object;
    define a boundary surrounding the first points while minimizing a volume of space that is both (i) contained by the boundary and (ii) identified as unoccupied, wherein defining the boundary includes calculating the volume; and
    actuate a component with respect to a vehicle based on the boundary.

2. The computer of claim 1, wherein the points are described in the sensor data as three-dimensional points, and the instructions further include to project the points into two-dimensional horizontal space before defining the boundary.

3. The computer of claim 1, wherein the instructions further include to identify space as unoccupied upon determining that the sensor has an unobstructed view through the space to one of the points.

4. The computer of claim 1, wherein the boundary is a rectangular bounding box.

5. The computer of claim 1, wherein the instructions further include to generate a convex hull surrounding the first points, and to define the boundary as a rectangular bounding box based on the convex hull.

6. The computer of claim 5, wherein
    the instructions further include to generate a plurality of candidate rectangular bounding boxes based on the convex hull;
    defining the boundary includes selecting a first candidate rectangular bounding box from the candidate rectangular bounding boxes; and
    of the candidate rectangular bounding boxes, the first candidate rectangular bounding box contains a minimum volume of space that is both (i) contained by the respective candidate rectangular bounding box and (ii) identified as unoccupied.

7. The computer of claim 6, wherein the convex hull includes a plurality of line segments, each candidate rectangular bounding box includes four sides, and each candidate rectangular bounding box has one side overlapping one line segment of the convex hull and has a minimum length and width to surround all the first points.

8. The computer of claim 1, wherein the vehicle includes the computer, and the component is at least one of a steering system, a brake system, or a propulsion of the vehicle.

9. The computer of claim 1, wherein the object is the vehicle, and the component is an infrastructure component in proximity to the vehicle.

10. A method comprising:
receiving data from a sensor specifying a plurality of points, the points including a plurality of first points that describe an object;
defining a boundary surrounding the first points while minimizing a volume of space that is both (i) contained by the boundary and (ii) identified as unoccupied, wherein defining the boundary includes calculating the volume; and
actuating a component with respect to a vehicle based on the boundary.

11. The method of claim 10, wherein the points are described in the sensor data as three-dimensional points, the method further comprising projecting the points into two-dimensional horizontal space before defining the boundary.

12. The method of claim 10, further comprising identifying space as unoccupied upon determining that the sensor has an unobstructed view through the space to one of the points.

13. The method of claim 10, wherein the boundary is a rectangular bounding box.

14. The method of claim 10, further comprising generating a convex hull surrounding the first points, and defining the boundary as a rectangular bounding box based on the convex hull.

15. The method of claim 14, further comprising generating a plurality of candidate rectangular bounding boxes based on the convex hull;
wherein defining the boundary includes selecting a first candidate rectangular bounding box from the candidate rectangular bounding boxes; and
of the candidate rectangular bounding boxes, the first candidate rectangular bounding box contains a minimum volume of space that is both (i) contained by the respective candidate rectangular bounding box and (ii) identified as unoccupied.

16. The method of claim 15, wherein the convex hull includes a plurality of line segments, each candidate rectangular bounding box includes four sides, and each candidate rectangular bounding box has one side overlapping one line segment of the convex hull and has a minimum length and width to surround all the first points.

17. The method of claim 10, wherein the component is at least one of a steering system, a brake system, and a propulsion of the vehicle.

18. The method of claim 10, wherein the object is the vehicle, and the component is an infrastructure component in proximity to the vehicle.

19. A system comprising:
a computer programmed to
receive data from a sensor specifying a plurality of points, the points including a plurality of first points that describe an object; and
define a boundary surrounding the first points while minimizing a volume of space that is both (i) contained by the boundary and (ii) identified as unoccupied, wherein defining the boundary includes calculating the volume; and
means for actuating a component with respect to a vehicle based on the boundary.

20. The computer of claim 1, wherein
the instructions further include to generate a plurality of candidate boundaries,
defining the boundary includes selecting a first candidate boundary from the candidate boundaries; and
of the candidate boundaries, the first candidate boundary contains a minimum volume of space that is both (i) contained by the respective candidate boundary and (ii) identified as unoccupied.

* * * * *